US009667040B2

(12) United States Patent
Fujita et al.

(10) Patent No.: US 9,667,040 B2
(45) Date of Patent: May 30, 2017

(54) BUS BAR STRUCTURE AND POWER CONVERTER USING BUS BAR STRUCTURE

(71) Applicant: Hitachi Automotive Systems, Ltd., Hitachinaka-shi, Ibaraki (JP)

(72) Inventors: Yuki Fujita, Hitachinaka (JP); Kaname Sasaki, Hitachinaka (JP); Kenichirou Nakajima, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/030,109

(22) PCT Filed: Sep. 24, 2014

(86) PCT No.: PCT/JP2014/075151
§ 371 (c)(1),
(2) Date: Apr. 18, 2016

(87) PCT Pub. No.: WO2015/064247
PCT Pub. Date: May 7, 2015

(65) Prior Publication Data
US 2016/0268782 A1 Sep. 15, 2016

(30) Foreign Application Priority Data
Oct. 30, 2013 (JP) ................................. 2013-224879

(51) Int. Cl.
*H02B 1/20* (2006.01)
*H02M 7/00* (2006.01)

(52) U.S. Cl.
CPC .............. *H02B 1/20* (2013.01); *H02M 7/003* (2013.01)

(58) Field of Classification Search
CPC ................................. H02B 1/20; H02M 7/003
(Continued)

(56) References Cited

U.S. PATENT DOCUMENTS 6,618,278 B2 * 9/2003 Suzuki ................... H02M 7/003
361/679.02
2003/0001438 A1 * 1/2003 Nii ......................... H02M 7/003
307/147
(Continued)

FOREIGN PATENT DOCUMENTS

JP 2003-9507 A 1/2003
JP 2004-304874 A 10/2004
(Continued)

OTHER PUBLICATIONS

International Search Report (PCT/ISA/210) issued in PCT Application No. PCT/JP2014/075151 dated Dec. 22, 2014 with English translation (4 pages).
(Continued)

*Primary Examiner* — Anthony Haughton
*Assistant Examiner* — Yahya Ahmad
(74) *Attorney, Agent, or Firm* — Crowell & Moring LLP (57) ABSTRACT

Inductance is reduced while high insulation reliability between positive and negative electrodes of a DC bus bar is ensured. The DC bus bar 801a (801b) is held; the bus bar 801a (801b) is fixed by an insulating member 802a (802b) having an insulating property, with one surface 14 (15) of the bus bar 801a (801b) exposed; the bus bar 801a is arranged such that the surface 14 of the bus bar 801a faces the surface 15 of the second bus bar 801b; an insulating sheet 803 is held between the bus bar 801a and the bus bar 801b; the first insulating member 802a has a projecting part 804a projecting toward the second insulating member 802b; and the projecting part 804a has, at an end part thereof, an abutting surface 13 in contact with the second insulating member 802b.

10 Claims, 7 Drawing Sheets

(58) Field of Classification Search
USPC .................................. 361/611, 624, 637, 648
See application file for complete search history.

(56) References Cited

U.S. PATENT DOCUMENTS

| | | | | |
|---|---|---|---|---|
| 2012/0300417 | A1* | 11/2012 | Kusukawa | H02G 5/005 361/748 |
| 2016/0155572 | A1* | 6/2016 | Ramm | H01G 4/40 361/782 |
| 2016/0156278 | A1* | 6/2016 | Ramm | H02B 1/20 361/624 |
| 2016/0157381 | A1* | 6/2016 | Takeuchi | H05K 7/20927 361/709 |
| 2017/0063066 | A1* | 3/2017 | Doo | H02G 5/06 |

FOREIGN PATENT DOCUMENTS

| | | | |
|---|---|---|---|
| JP | 2012-95472 A | 5/2012 | |
| WO | WO 2011/093239 A1 | 8/2011 | |

OTHER PUBLICATIONS

Japanese-language Written Opinion (PCT/ISA/237) issued in PCT Application No. PCT/JP2014/075151 dated Dec. 22, 2014 (4 pages).

\* cited by examiner

BUS BAR STRUCTURE AND POWER CONVERTER USING BUS BAR STRUCTURE

TECHNICAL FIELD

The present invention relates to a power converter that converts DC power to AC power or converts AC power to DC power. In particular, the present invention relates to the power converter adapted for being mounted on a vehicle.

BACKGROUND ART

Miniaturization and improvement in energy efficiency of hybrid automobiles or electric automobiles have led to a demand for miniaturization and improvement in efficiency of vehicle components including power converters used in the hybrid automobiles or the electric automobiles.

A DC bus bar that is mounted on the power converter and transmits a DC current can contribute to the miniaturization of the power converter and a reduction in parasitic inductance of the DC bus bar when an interval between positive and negative electrodes is made as short as possible. This can bring about a reduction in loss of a switching element used in the power converter. In other words, conversion efficiency of the power converter can be improved.

In this case, insulation between the positive and negative electrodes of the DC bus bar needs to be ensured in order to shorten the interval between the positive and negative electrodes of the DC bus bar. PTL 1 describes an invention to cause a plurality of DC bus bars to overlap each other and cast resin into an interval between the bus bars to save a space and ensure insulation.

CITATION LIST

Patent Literature

PTL 1: Publication of Patent Application No. 2004-304874

SUMMARY OF INVENTION

Technical Problem

In a structure of PTL 1, in a case where an interval between positive and negative electrodes is further shortened for the purpose of further miniaturization and improvement in conversion efficiency, a defect such as a through hole might occur in a resin layer with which the interval between the positive and negative electrodes is filled. In other words, it has become more and more difficult to improve performance while achieving both a reduction in inductance realized by making the interval between the positive and negative electrodes smaller and insulation reliability between the positive and negative electrodes.

An object of the present invention is to contribute to miniaturization and improvement in efficiency of a power converter by reducing inductance while ensuring high insulation reliability between positive and negative electrodes of a DC bus bar.

Solution to Problem

A bus bar structure used in the present invention is a bus bar structure that supplies DC power from a DC power supply to a power semiconductor module, wherein the bus bar has a first bus bar and a second bus bar, the first bus bar is fixed by a first insulating member having an electrical insulating property, with one surface of the first bus bar exposed, the second bus bar is fixed by a second insulating member having an electrical insulating property, with one surface of the second bus bar exposed, the first bus bar is arranged such that the one surface of the first bus bar faces the one surface of the second bus bar, an insulating object that is different from the first and second insulating members is held between the first bus bar and the second bus bar, the first insulating member has a first projecting part projecting toward the second insulating member, and the first projecting part has, at an end part of the first projecting part, an abutting surface in contact with the second insulating member.

Advantageous Effects of Invention

According to the present invention, it is possible to reduce inductance while ensuring insulation reliability between positive and negative electrodes of a DC bus bar.

DESCRIPTION OF EMBODIMENTS

Hereinafter, embodiments of a power converter according to the present invention will be described with reference to the drawings. In the respective drawings, identical elements are denoted by the same reference signs, and overlapping explanations will be omitted.

The power converter 200 according to the present embodiment is mainly used in a hybrid automobile or an electric automobile. However, the power converter 200 according to the present embodiment may be used in other applications for achieving the advantageous effects of the power converter 200. For example, the power converter 200 according to the present embodiment may be used in an inverter for a household electric appliance such as a refrigerator and an air conditioner for the purpose of improving productivity and cooling performance. Alternatively, the power converter 200 according to the present embodiment may be used in an inverter for an industrial apparatus, a use environment of which is similar to that of an inverter for a vehicle.

Example 1

Figure 1:
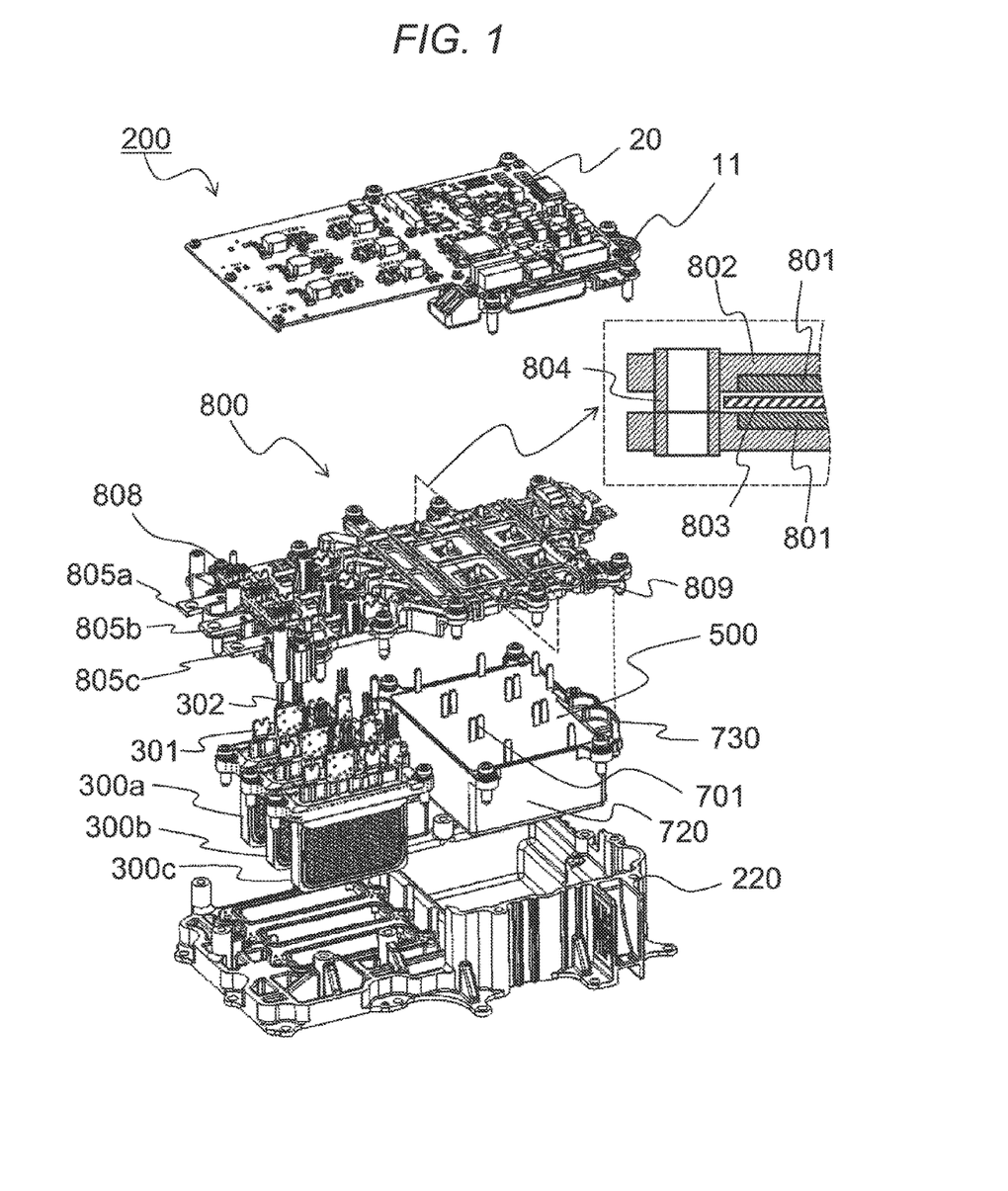
FIG. 1 is a perspective view of an overall configuration of a power converter 200 disassembled into components for explanation purposes.

FIG. 1 is a perspective view of an overall configuration of the power converter 200 according to the present embodiment disassembled into components for explanation purposes. The power converter 200 includes a circuit board 20, a metal base plate 11, a bus bar assembly 800, power semiconductor modules 300a to 300c, and a capacitor module 500. These components are housed in a case 220.

The power semiconductor modules 300a to 300c to be described later convert DC power to AC power. The capacitor module 500 to be described later smooths DC power. The circuit board 20 to be described later is equipped with a drive circuit part 20a (refer to FIG. 4) that outputs a drive signal for driving the power semiconductor modules 300a to 300c. The circuit board 20 is also equipped with a control circuit part 20b (refer to FIG. 4) that outputs, to a drive circuit, a control signal for controlling the power semiconductor modules 300a to 300c. Examples of these circuit systems are described in Publication of Patent Application No. 2011-217550.

The case 220 forms a flow passage forming body through which a refrigerant for cooling the power semiconductor modules 300a to 300b and the capacitor module 500 flows.

The bus bar assembly 800 includes a DC side conductor plate 801, an insulating sheet 803, AC side conductor plates 805a to 805c, and an insulating member 802 that holds these components. The bus bar assembly 800 further includes a current sensor 808. The DC side conductor plate 801 transmits DC power from the capacitor module 500 to the power semiconductor modules 300a to 300c. The DC side conductor plate 801 includes a positive side conductor plate 801a and a negative side conductor plate 801b as described later. Power converted to AC in the power semiconductor modules 300a to 300c is output from the AC side conductor plates 805a to 805c. The AC side conductor plates 805a to 805c are arranged to pass through a penetrating hole of the current sensor 803.

Figure 2A:
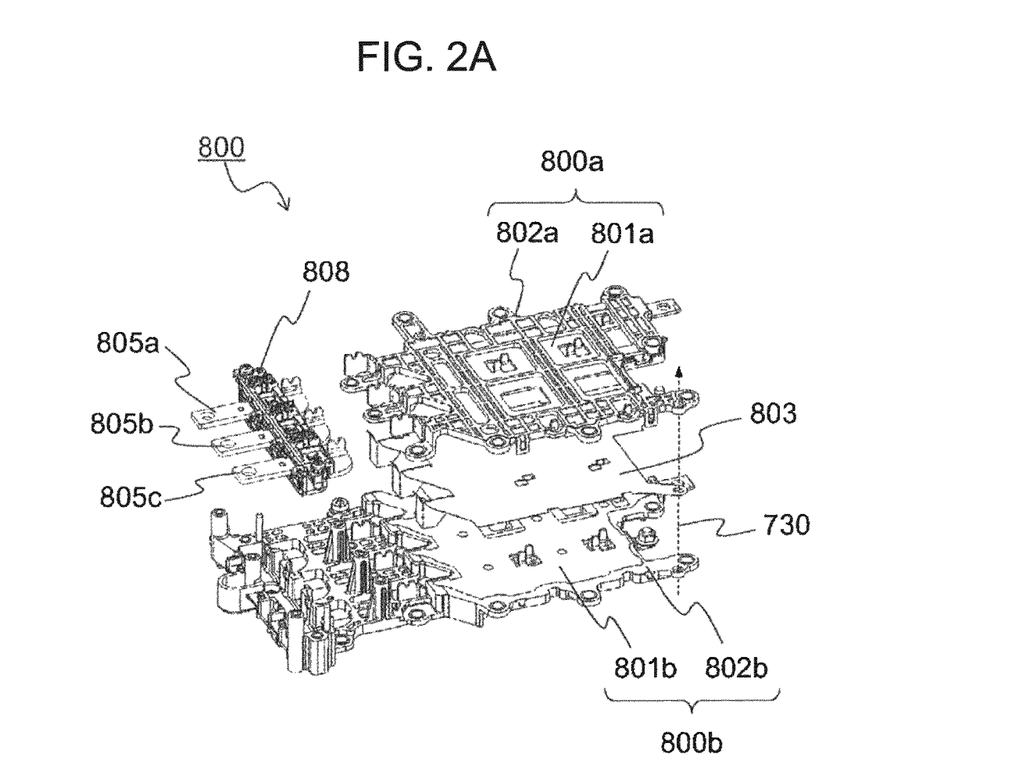
FIG. 2A is an exploded perspective view of an overall configuration of a bus bar assembly 800 disassembled into components for explanation purposes.

FIG. 2(a) is an exploded perspective view of an overall configuration of the bus bar assembly 800 disassembled into components for explanation purposes. The bus bar assembly 800 mainly includes a first bus bar assembly 800a, a second bus bar assembly 800b, and the insulating sheet 803. The first bus bar assembly 800a faces the second bus bar assembly 800b via the insulating sheet 803.

The first bus bar assembly 800a includes the positive side conductor plate 801a and a first insulating member 802a having an electrical insulating property. The positive side conductor plate 801a is covered with the first insulating member 802a, with one surface of the positive side conductor plate 801a facing the second bus bar assembly 800b exposed.

The second bus bar assembly 800b includes the negative side conductor plate 801b and a second insulating member 802b having an electrical insulating property. The negative side conductor plate 801b is covered with the second insulating member 802b, with one surface of the negative side conductor plate 801b facing the first bus bar assembly 800a exposed.

The insulating sheet 803 is arranged between the first bus bar assembly 800a and the second bus bar assembly 800b. The insulating sheet 803 is arranged so as to cover the exposed surfaces of the positive side conductor plate 801a and the negative side conductor plate 801b.

The second insulating member 802b is formed to extend from a region facing the first bus bar assembly 800a such that the current sensor 808 is provided.

A connection terminal (to be described later) for connecting the bus bar assembly 800 to the power semiconductor modules 300a to 300c is formed on the bus bar assembly 800. In the first insulating member 802a and the second insulating member 802b, a penetrating hole for inserting thereinto a terminal of the power semiconductor modules 300a to 300c is formed adjacent to the connection terminal.

Figure 2B:
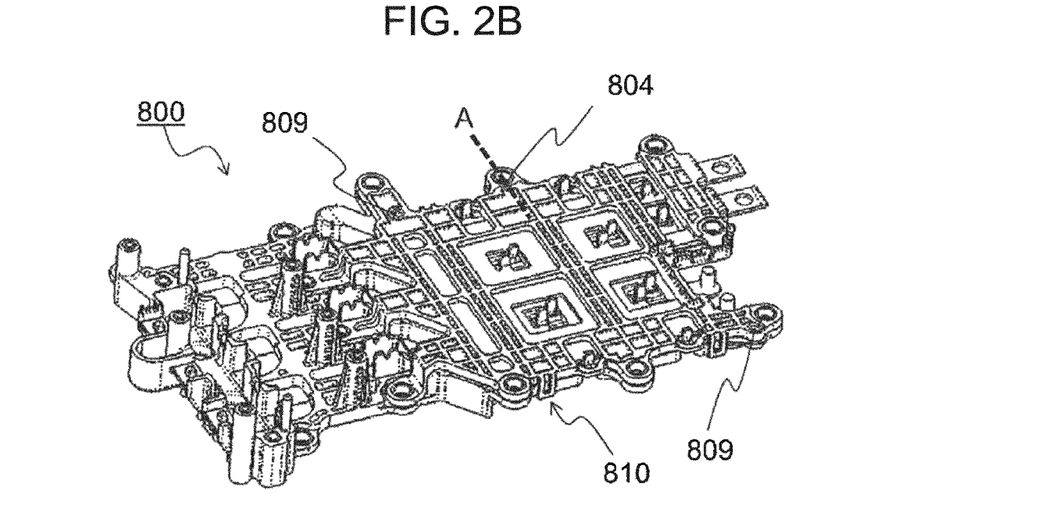
FIG. 2B is an external perspective view of the bus bar assembly 800.

FIG. 2(b) is an external perspective view of the bus bar assembly 800, with the components of the bus bar assembly 800 illustrated in FIG. 2(a) assembled. The AC side conductor plate 805 and the current sensor 808 are not illustrated. Two positioning penetrating holes 809 into which positioning pins 730 provided on the capacitor module 500 are fit are formed in the bus bar assembly 800.

The first bus bar assembly 800a is locked to the second bus bar assembly 800b by a structural member fixing part 810 formed in a claw shape, with the insulating sheet 803 sandwiched between the first bus bar assembly 800a and the second bus bar assembly 800b.

Figure 3:
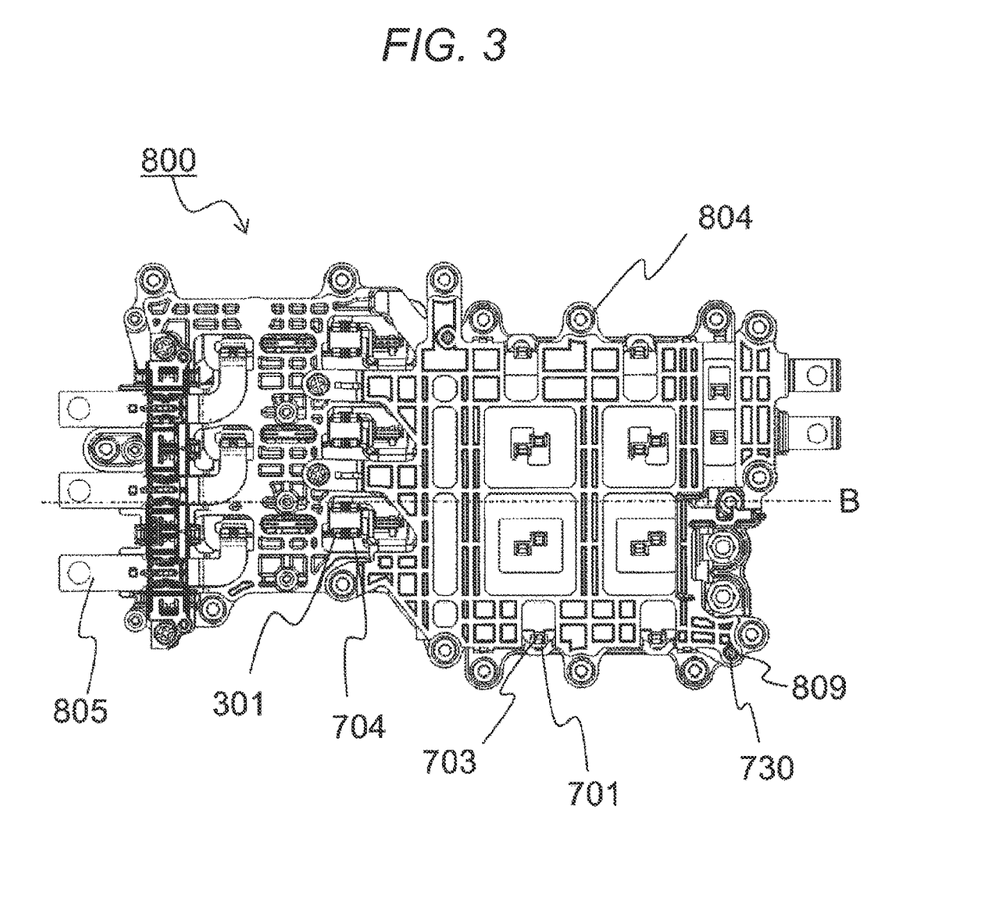
FIG. 3 is a top view of the power converter 200 from which a circuit board 20 and a board base plate 11 are removed.

FIG. 3 is a top view of the power converter 200 from which the circuit board 20 and the board base plate 11 are removed. The bus bar assembly 800 has a capacitor connecting part 703 and a power module connecting part 704. The capacitor connecting part 703 and the power module connecting part 704 are connected to the DC side conductor plate 801 of the bus bar assembly 800.

Figure 4:
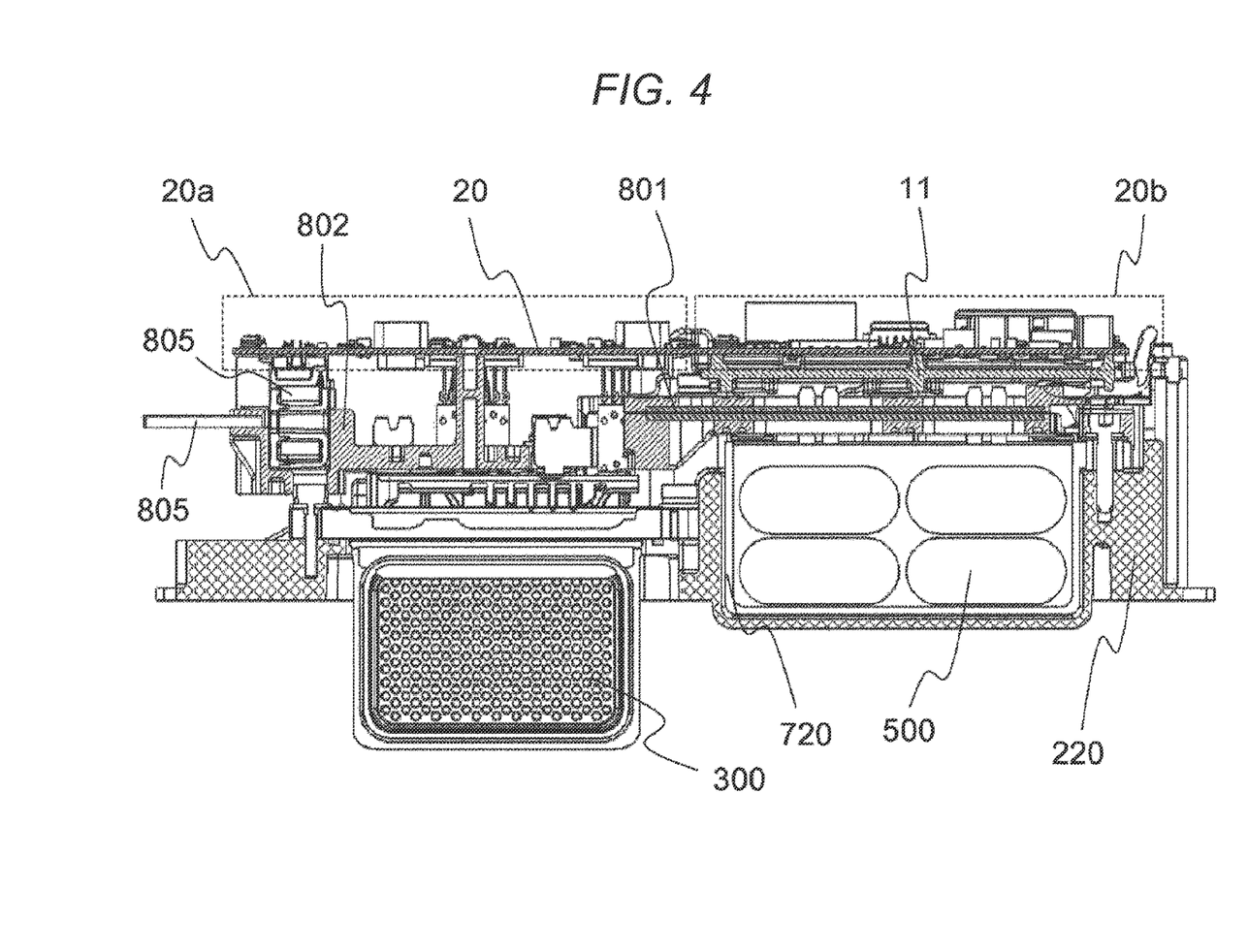
FIG. 4 is a cross-sectional view of the power converter 200 taken along cross-section B of FIG. 3.

The capacitor connecting part 703 is connected to a lead terminal 701 of the capacitor 500. The power module connecting part 704 is connected to a DC terminal 301 of the power semiconductor module 300. The capacitor connecting part 703 and the power module connecting part 704 are formed to project in the same direction. This enables connection without changing a direction of a workpiece when an operation for connecting the capacitor connecting part 703 and the power module connecting part 704 is performed, whereby workability can be improved. FIG. 4 is a cross-sectional view taken along cross-section B of FIG. 3.

The DC side conductor plate 801 of the bus bar assembly 800 is arranged above the capacitor module 500. The DC side conductor plate 801 and the capacitor module 500 are coupled once the capacitor connecting part 703 formed on the DC side conductor plate 801 is bonded to the lead terminal 701 extending upward from the capacitor module 500 by welding or the like as illustrated in FIG. 3. The control circuit part 20b of the circuit board 20 is arranged further above the capacitor module 500 via the bus bar assembly 800. The metal base plate 11 is arranged between the bus bar assembly 800 and the control circuit part 20b. Since the control circuit part 20b uses a voltage smaller than that used in the drive circuit part 20a, the control circuit part 20b is easily affected by noise as compared with the drive circuit part 20a. Owing to the feature that the metal base plate 11 is arranged between the bus bar assembly 800 and the control circuit part 20b, an influence of noise propagated through the control circuit part 20b can be reduced.

Figure 5A:
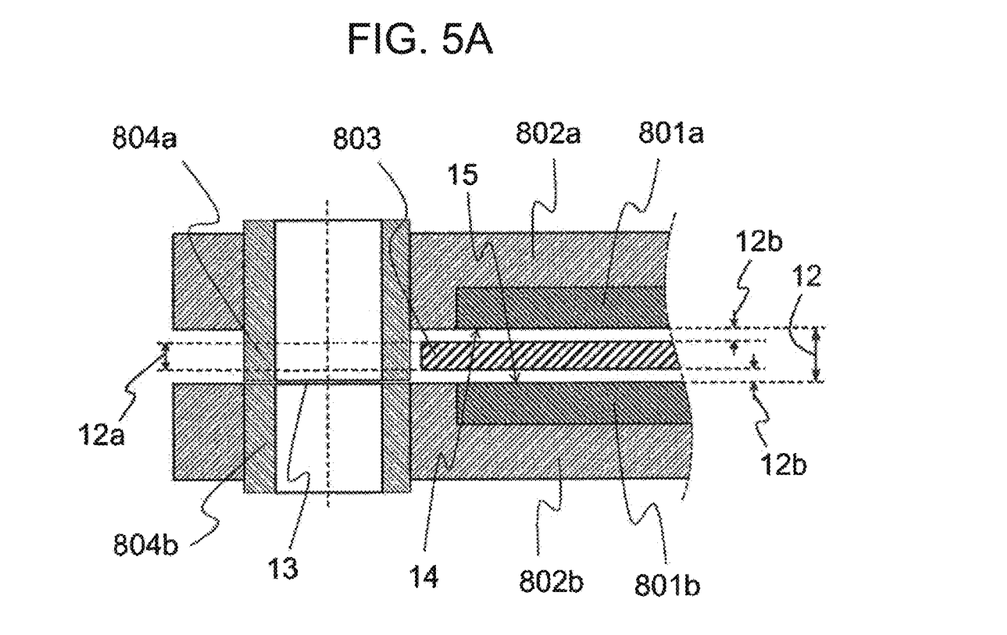
FIG. 5A is a cross-sectional view of the bus bar assembly 800 taken along cross-section A of FIG. 2.

FIG. 5(a) is a schematic view illustrating a cross-section of the bus bar assembly 800 taken along cross-section A of FIG. 2(b).

A structural member 804a formed in a projecting shape is formed at the first insulating member 802a holding the positive side conductor plate 801a. The structural member 804a projects toward the second insulating member 802b from one surface of the first insulating member 802a facing the second insulating member 802b. The structural member 804a has, at an end part of the structural member 804a, an abutting surface 13 in contact with the second insulating member 802b. The structural member 804a is formed to project in a normal direction of the exposed surface 14 of the positive side conductor plate 801a more than the exposed surface 14.

In a structural member 804b formed in a projecting shape, a penetrating hole penetrating in a projecting axial direction is formed. A fixing member such as a screw is inserted into the penetrating hole.

Although only one structural member 804a is illustrated in FIG. 5(a), a plurality of the structural members 804a is formed around the DC side conductor plate 801 in the present embodiment. Owing to the feature that the structural member 804a formed in the projecting shape is provided at the first insulating member 802a holding the positive side conductor plate 801a, the positive side conductor plate 801a can control a distance to the negative conductor plate 801b using the structural member 804a.

The distance between the positive side conductor plate 801a and the negative side conductor plate 801b is desirably made as small as possible in order to more efficiently obtain an inductance cancellation effect. However, in a case where an insulating property between the positive and negative electrodes is tried to be ensured by filling an interval between the positive side conductor plate 801a and the negative side conductor plate 801b with a resin material having an insulating property, the narrower the distance between the positive and negative electrodes is, the more easily a defect such as a through hole occurs during the filling with the resin material. As a result, a short circuit occurs between the positive and negative electrodes has been therefore conventionally difficult to achieve both an electrical insulating property and a reduction in inductance.

In this regard, the bus bar assembly 800 of the present embodiment is configured such that the insulating sheet 803 that is different from the first insulating member 802a and the second insulating member 802b is arranged between the positive side conductor plate 801a and the negative side conductor plate 801b. For example, a laminated PET material or the like is used as the insulating sheet 803. Generally, such an insulating material can be easily processed into a thin sheet. Since the insulating sheet 803 has a laminated structure, a possibility that through holes occurring in the respective sheets are connected is low, leading to high insulation reliability.

In a case where the insulating sheet 803 is arranged between the positive side conductor plate 801a and the negative side conductor plate 801b, the distance 12 between the positive side conductor plate 801a and the negative side conductor plate 801b needs to ensure, in terms of manufacturing requirements, at least the sum of a thickness 12a of the insulating sheet 803 and a necessary clearance 12b prepared in consideration of geometric tolerances of the positive side conductor plate 801a and the negative side conductor plate 801b. Owing to the structural member 804a projecting from the first insulating member 801a, the bus bar assembly 800 of the present embodiment enables the distance 12 between the positive side conductor plate 801a and the negative side conductor plate 801b to be controlled to a minimum distance in terms of manufacturing requirements, whereby an increase in the inductance can be suppressed.

As described above, the power converter according to the present embodiment is configured such that the insulating sheet 803 that is different from the first insulating member 802a and the second insulating member 802b is held in a sandwiched manner in the bus bar assembly 800 having the DC side bus bar 801 that supplies a DC current to the power semiconductor module 300, and the first insulating member 802a has the structural member 804a formed in the projecting shape projecting toward the second insulating member 802b. Therefore, the inductance from a DC power supply to the power semiconductor module can be suppressed to a low level, and the electrical insulation can be ensured with high reliability.

The first insulating member 802a and the second insulating member constituting the bus bar assembly 800 are each formed of a resin member having an insulating property. The bus bar assembly 800 is formed with the positive side conductor plate 801a and the negative side conductor plate 801b exposed, for example, by means of insert molding or the like. The structural member 804a provided to ensure the distance between the positive side conductor plate 801a and the negative side conductor plate 801b may be integrally formed of the same resin material as the first insulating member 802a. In the present embodiment, however, the structural member 804a is formed of a metal member. The second insulating member 802b has an abutting member 804b made of metal at a part abutting on the structural member 804a made of metal held by the first insulating member 802a.

The abutting member 804b forms the abutting surface 13 between 804a formed in the projecting shape and the abutting member 804b. Since the abutting surface 13 is formed by the metal materials, a sink mark due to a load such as vibration and temperature can hardly occur. In a case where the abutting surface 13 is formed by resin materials, a sink mark on the resin material might occur in the abutting surface 13, and it is difficult to keep the distance between the positive and negative conductor plates with high reliability. According to the bus bar assembly 800 of the present embodiment, however, the inductance can be reduced with high reliability.

The insulating member 802 constituting the bus bar assembly 800 is configured to fix the drive circuit part 20a of the circuit board 20. As illustrated in FIG. 4, the drive circuit part 20a is arranged above the power semiconductor element 300. Since the drive circuit part 20a uses a voltage greater than that used in the control circuit part 20b, an insulation distance to other components needs to be sufficiently secured as compared with the control circuit part 20b. Since the insulating member 802 is formed of a resin material having an insulating property, another insulating member does not need to be provided between the drive circuit part 20a and the insulating member 802, whereby high density mounting can be realized.

Generally, copper having good electrical conductivity is used as the conductor elate, and a thickness and a width of the conductor plate are determined according to current density. An interval between the conductor plates is desirably made as short as possible for the purpose of reducing the inductance.

In order to ensure the insulation between the positive side conductor plate and the negative side conductor plate in FIG. 5(a), a distance between the conductor plate 801 and the boss 804a made of metal also needs to be lengthened to such a distance as to enable the insulation.

In order to ensure the insulation between the positive side conductor plate and the negative side conductor plate, the insulating sheet 803 is not formed in the same size as the conductor plate 801 but needs to protrude from an edge of the conductor plate 801 to a certain distance.

The insulating member 802 that covers the DC side conductor plate 801 is fixed to the case 202 by, for example, bolt fastening. Therefore, a weight of the DC side conductor plate 801 is applied to the case 220 through the insulating member 802. This can prevent concentration of a stress applied to a contact part between the lead terminal 703 of the capacitor module 500 and the DC side conductor plate 801. As a result, welding structure or the like can be employed in, for example, a bonded part, whereby miniaturization and a reduction in the number of components can be realized.

The current sensor 803 and the AC side conductor plate 805 are assembled to the insulating sheet 803 mounted on the bus bar assembly 800, and the assembled bus bar assembly 800 is further assembled.

The power module 300 has the DC side terminal 301 and an AC side terminal 302. By assembling the bus bar assembly 800 to which the DC side conductor plate and the AC side conductor plate are integrally assembled, connection can be performed for the DC side terminal 301 and the AC side terminal 302 in the same assembling process. As a result, assembling efficiency can be improved.

The power converter 200 of the present embodiment is configured such that the DC side conductor plate is not structured integrally with but separated from the capacitor module 500. In this manner, an air layer is provided between the DC side conductor plate and the capacitor module 500, resulting in such a structure that heat generated in the DC side conductor plate, which is a main factor in heat reception in the capacitor module, is hardly transferred to the capacitor module 500. A guaranteed temperature of a film capacitor cell 700 for smoothing is lower than those of other components mounted on the power converter 200. In a case where the temperature of the film capacitor cell 700 is equal to or higher than the guaranteed temperature, a life of the film capacitor cell 700 is rapidly reduced, and a function as a smoothing capacitor is not satisfied. Owing to the feature that the DC side conductor plate is separated from the capacitor module 500, therefore, an influence of the heat transferred from the DC side conductor plate arranged above the capacitor module 500 can be suppressed.

The capacitor 500 has a case 720 that houses therein the capacitor cell. The positioning pin 730 projecting in an arrangement direction of the bus bar assembly 800 is formed on the case 720. The positioning penetrating hole 805 is formed in the insulating member 802 mounted on the bus bar assembly 800. The positioning pin 730 is therefore configured to be inserted into the positioning penetrating hole 805.

As a result, a relative position between the bus bar assembly 800 and the capacitor 500 is determined, whereby the capacitor connecting part 703 formed on the DC side conductor plate 801 and the lead terminal 701 protruding from the capacitor can be arranged at the same position. Bonding reliability can thus be improved.

Example 2

Next, a configuration of the power converter according to Example 2 will be described. In the present example, since only a structure of the bus bar assembly 800 is changed from that of Example 1, explanations of other configurations are omitted.

Figure 5B:
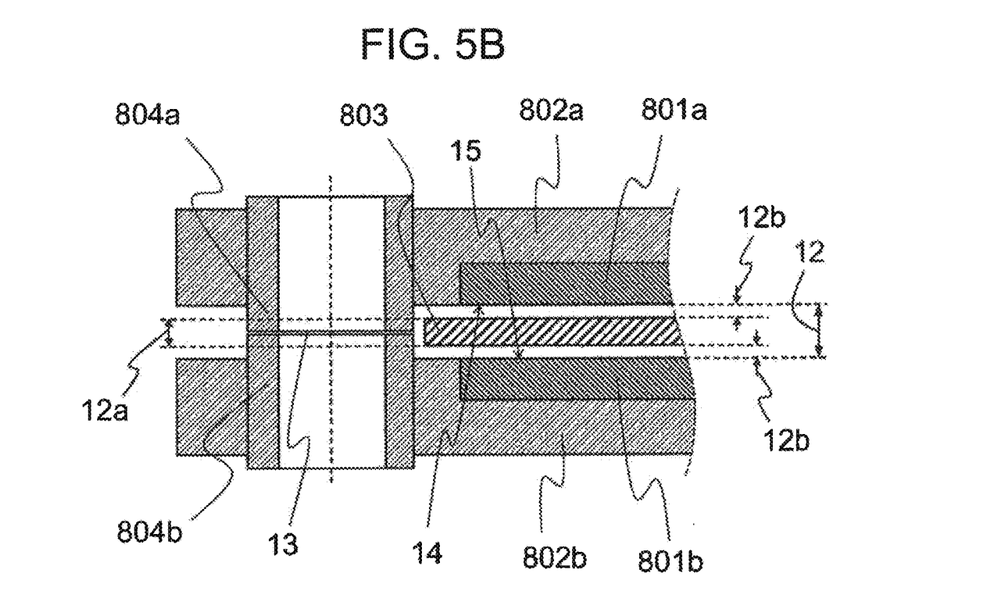
FIG. 5B is a cross-sectional view of a bus bar assembly 800 according to another embodiment.

FIG. 5(b) is a schematic view illustrating cross-section of the bus bar assembly 800 according to Example 2. In the present example, a first structural member 804a projecting from the first insulating member 802a and a second structural member 804b projecting from the second insulating member 802b are formed. The first structural member 804a has, at an end of the first structural member 804a, an abutting surface in contact with an end of the second structural member 804b.

The first structural member 804a is formed to project in the normal direction of the exposed surface 14 of the positive side conductor plate 801a more than the exposed surface 14. The second structural member 804b is formed to project in a normal direction of the exposed surface 15 of the negative side conductor plate 801b more than the exposed surface 15. The first structural member 804a and the second structural member 804b are formed such that the sum of a projecting distance of the first structural member 804a and a projecting distance of the second structural member 804b is equal to the distance 12 between the conductor plates represented in Example 1.

In a case where a surface of the second insulating member 802b and the abutting surface 13 are on a substantially same plane, a position of the structural member 804a might be displaced due to vibration and deterioration in assembling performance or the like, and the structural member 804a might protrude from a region abutting on the abutting member 804b and abut on a resin part. Since the bus bar assembly of the present example is configured such that the first insulating member 802a has the first structural member 804a formed in the projecting shape and the second insulating member 802b has the second structural member 804b formed in the projecting shape, the first structural member 804a and the second structural member 804b never come into contact with the first insulating member 802a and the second insulating member 802b even if a relative position between the first structural member 804a and the second structural member 804b is displaced due to vibration or the like. Therefore, it is possible to prevent sink marks on the first insulating member 802a and the second insulating member 802b formed of resin materials, and to keep the distance between the conductor plates with high reliability.

The bus bar assembly 800 of the present embodiment is configured such that penetrating holes are provided in the first structural member 804a and the second structural member 804b. When the bus bar assembly 800 is fixed mainly by a screw, since the penetrating holes exist on the same axis, 800a and 800b can be fixed by a screw through the respective penetrating holes formed in 804. Therefore, different two components can be fixed simultaneously, whereby the number of assembling processes can be reduced.

Example 3

Figure 5C:
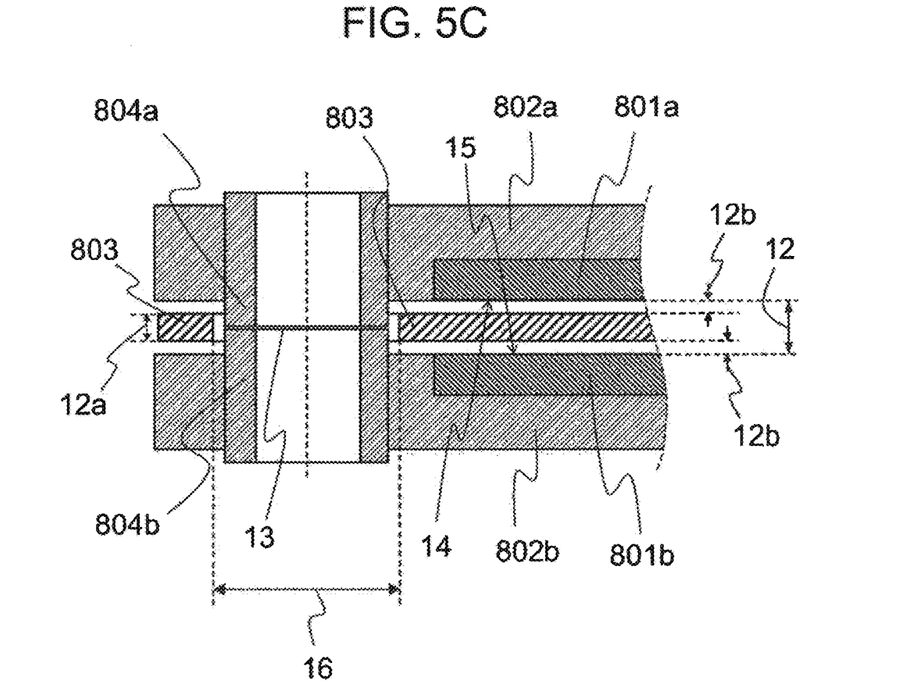
FIG. 5C is a cross-sectional view of a bus bar assembly 800 according to another embodiment.
Figure 5D:
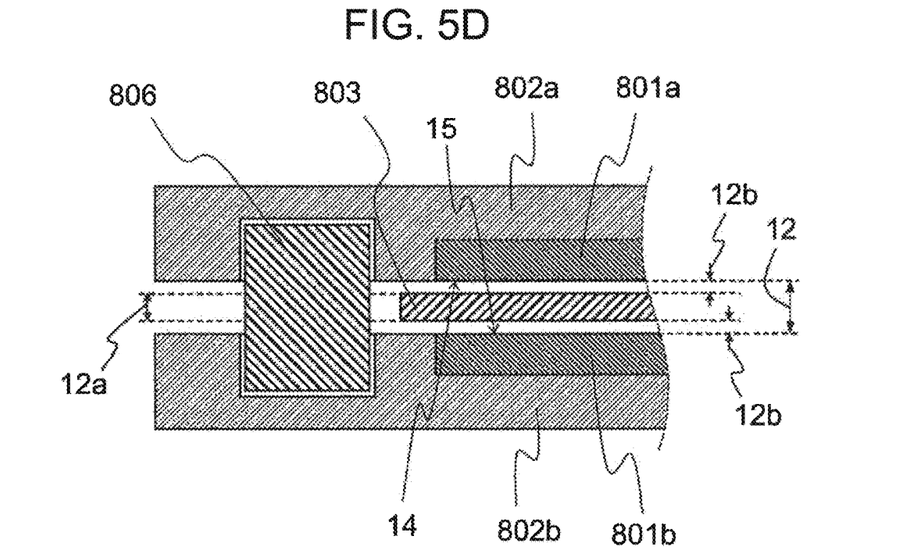
FIG. 5D is a cross-sectional view of a bus bar assembly 800 according to another embodiment.
Figure 5E:
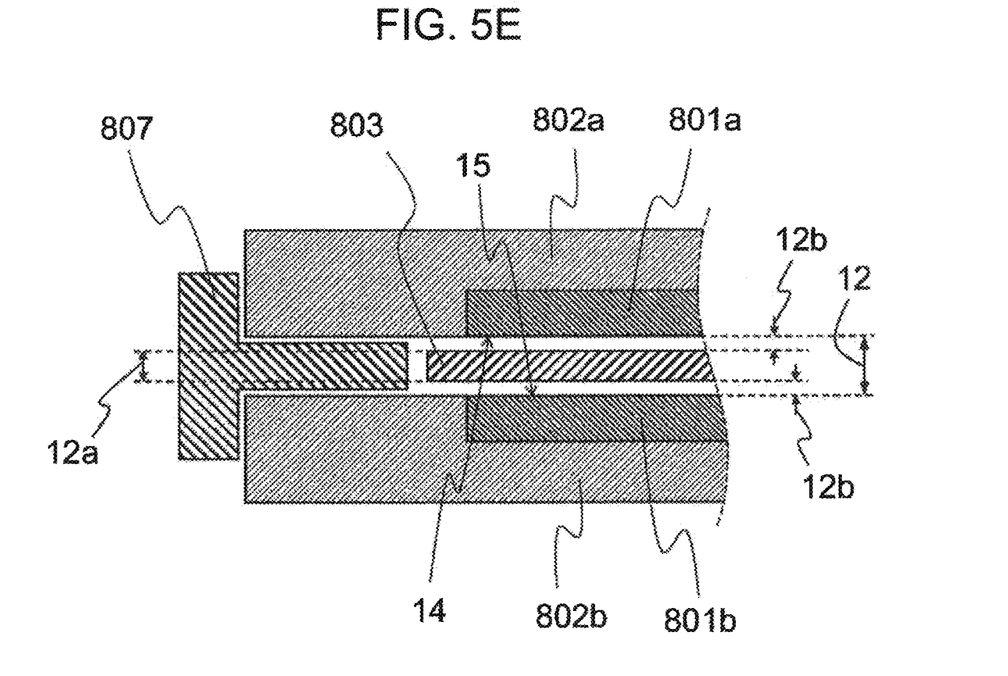
FIG. 5E is a cross-sectional view of a bus bar assembly 800 according to another embodiment.

FIG. 5(c) is a schematic view illustrating a cross-section of the bus bar assembly 800 according to Example 3. A difference from Example 2 is that a positioning hole 16 is formed in the insulating sheet 803, and the first structural member 804a or the second structural member 804b is formed so as to pass through the positioning hole 16.

When the insulating sheet 803 is not fixed to the first insulating member 802a or the second insulating member 802b, a position of the insulating sheet 803 is not defined in an in-plane direction of the exposed surface of the positive side conductor plate 801a or the negative side conductor plate 801b. If there is a region in which the insulating sheet 803 is not formed between the exposed surface of the positive side conductor plate 801a and the exposed surface of the negative side conductor plate 801b, a distance required for ensuring the insulation in the region cannot be ensured, whereby reliability might be deteriorated.

According to the bus bar assembly 800 of the present embodiment, since the positioning hole 16 is formed in the insulating sheet 803, the position of the insulating sheet 803 in the in-plane direction is determined, whereby assembling workability can be improved and position displacement or the like in relation to vibration can be suppressed. Therefore, the insulating property between the positive and negative electrodes can be further ensured.

Example 4

FIGS. 5(*d*) and 5(*e*) are views illustrating other embodiments for ensuring the distance between the positive side conductor plate 801*a* and the negative side conductor plate 801*b*. In each of the embodiments, a structural member for ensuring the distance between the electrode side conductor plate 801*a* and the negative side conductor plate 801*b* is a different member from the first insulating member 802*a* and the second insulating member 802*b*.

The bus bar assembly 800 illustrated in FIG. 5(*d*) is configured such that recessed parts are formed in the first insulating member 802*a* and the second insulating member 802*b*, each made of an insulating resin. The recessed parts are formed so as to face each other. A structural member 806 is fit into the recessed parts.

The bus bar assembly 800 illustrated in FIG. 5(*e*) has a T-shaped structural member 807. The T-shaped structural member 807 is arranged on outer peripheral parts of the first insulating member 802*a* and the second insulating member 802*b* and arranged between the first insulating member 802*a* and the second insulating member 802*b*.

The structures illustrated in FIGS. 5(*d*) and 5(*e*) can also be used to ensure the distance between the positive side conductor plate 801*a* and the negative side conductor plate 801*b*.

The above-mentioned embodiments can be practiced in combination with one another.

REFERENCE SIGNS LIST

11 metal base plate
12 distance between first bus bar and second bus bar
12*a* thickness of insulating object 803
12*b* necessary clearance prepared in consideration of geometric tolerance between first bus bar and second bus bar
13 abutting surface
14 surface of first bus bar facing second bus bar
15 surface of second bus bar facing first bus bar
16 positioning hole
20 circuit board
20*a* drive circuit part
20*b* control circuit part
200 power converter
220 case
300 power semiconductor module
500 capacitor module
701 lead terminal
703 capacitor connecting part
704 power module connecting part
730 positioning pin
800 bus bar assembly
801 DC side conductor plate
802 insulating member
803 insulating sheet
804 structural member
805 AC side conductor plate
806 structural member
807 T-shaped structural member
808 current sensor
809 positioning penetrating hole
810 structural member fixing part

The invention claimed is:

1. A bus bar structure that supplies DC power from a DC power supply to a power semiconductor module, comprising:
the bus bar has a first bus bar and a second bus bar,
the first bus bar is fixed by a first insulating member having an electrical insulating property, with one surface of the first bus bar exposed,
the second bus bar is fixed by a second insulating member having an electrical insulating property, with one surface of the second bus bar exposed,
the first bus bar is arranged such that the one surface of the first bus bar faces the one surface of the second bus bar,
an insulating object that is different from the first and second insulating members is held between the first bus bar and the second bus bar,
the first insulating member has a first projecting part projecting toward the second insulating member, and
the first projecting part has, at an end part of the first projecting part, an abutting surface in contact with the second insulating member.

2. The bus bar structure according to claim 1, wherein
the first insulating member and the second insulating member are formed of resin,
the first projecting part is a member made of metal,
the second insulating member has an abutting member made of metal, and
the abutting member has the abutting surface in contact with the end part of the first projecting part.

3. The bus bar structure according to claim 2, wherein
the second insulating member has a second projecting part projecting toward the first projecting part, and
the second projecting part has the abutting surface at an end part of the second projecting part.

4. The bus bar structure according to claim 1, wherein
a positioning hole is formed in the insulating object, and
the insulating object is arranged such that the first projecting part passes through the positioning hole.

5. The bus bar structure according to claim 1, wherein
a first penetrating hole penetrating in an axial direction of the first projecting part is formed in the first projecting part,
a second penetrating hole is formed in the second insulating member on a same axial line as the first penetrating hole, and
the first insulating member is fixed to the second insulating member when a penetrating member is inserted into the first penetrating hole and the second penetrating hole.

6. A power converter comprising a bus bar structure that supplies DC power from a DC power supply to a power semiconductor module, comprising:
the bus bar has a first bus bar and a second bus bar,
the first bus bar is fixed by a first insulating member having an electrical insulating property, with one surface of the first bus bar exposed,
the second bus bar is fixed by a second insulating member having an electrical insulating property, with one surface of the second bus bar exposed,
the first bus bar is arranged such that the one surface of the first bus bar faces the one surface of the second bus bar, an insulating object that is different from the first and second insulating members is held between the first bus bar and the second bus bar, the first insulating member has a first projecting part projecting toward the second insulating member, and the first projecting part has, at an end part of the first projecting part, an abutting surface in contact with the second insulating member.

7. The power converter according to claim 6, wherein the first insulating member and the second insulating member are formed of resin, the first projecting part is a member made of metal, the second insulating member has an abutting member made of metal, and the abutting member has the abutting surface in contact with the end part of the first projecting part.

8. The power converter according to claim 7, wherein the second insulating member has a second projecting part projecting toward the first projecting part, and the second projecting part has the abutting surface at an end part of the second projecting part.

9. The power converter according to claim 6, wherein a positioning hole is formed in the insulating object, and the insulating object is arranged such that the first projecting part passes through the positioning hole.

10. The power converter according to claim 6, wherein a first penetrating hole penetrating in an axial direction of the first projecting part is formed in the first projecting part, a second penetrating hole is formed in the second insulating member on a same axial line as the first penetrating hole, and the first insulating member is fixed to the second insulating member when a penetrating member is inserted into the first penetrating hole and the second penetrating hole.

* * * * *